J. PALMER.
Making Springs.
No. 68,454.
Patented Sept. 3, 1867.
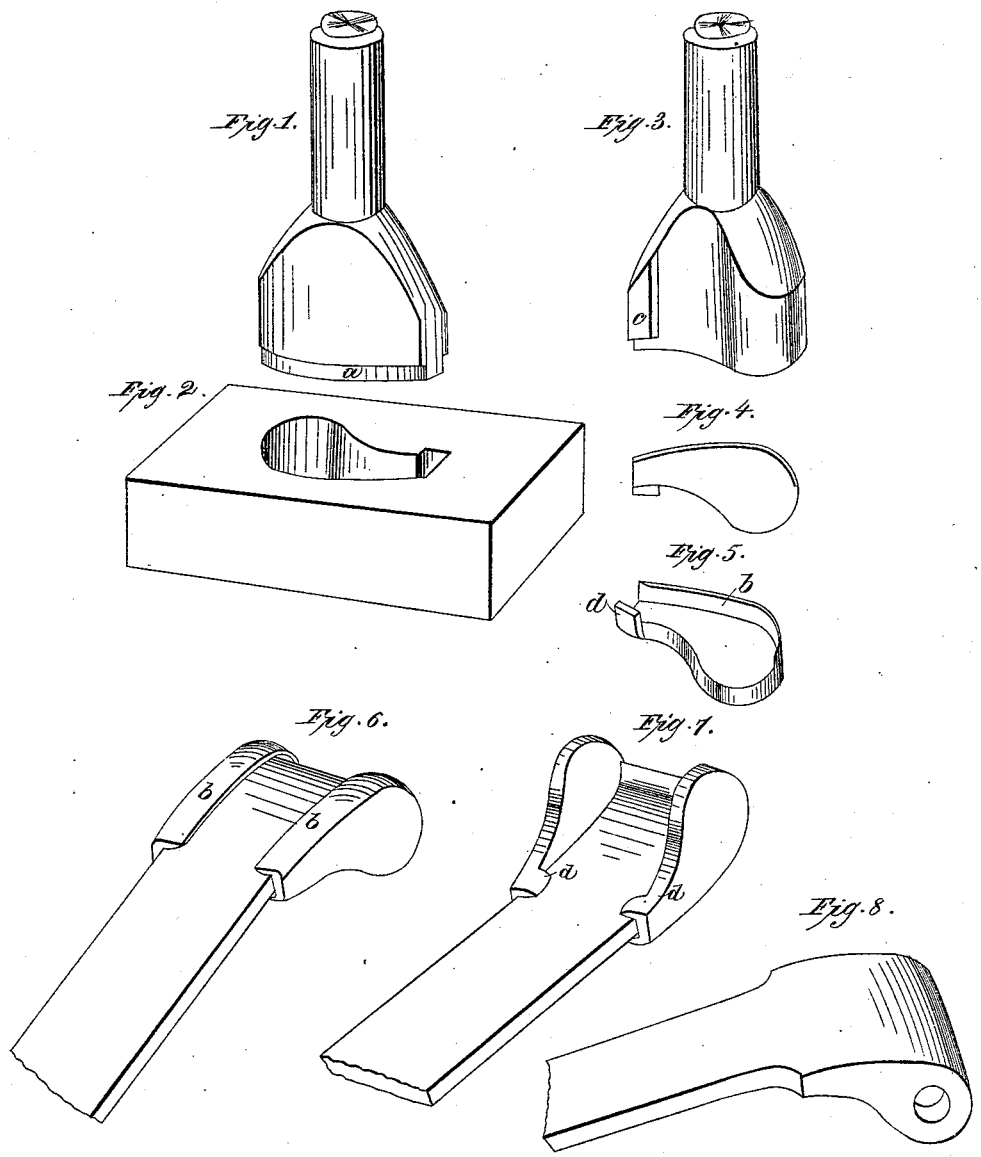

United States Patent Office.

JOSEPH PALMER, OF CONCORD, NEW HAMPSHIRE.

Letters Patent No. 68,454, dated September 3, 1867.

---

IMPROVED DIES FOR MAKING HEADS FOR ELLIPTIC SPRINGS.

---

The Schedule referred to in these Letters Patent and making part of the same.

---

TO ALL WHOM IT MAY CONCERN:

Be it known that I, JOSEPH PALMER, of Concord, in the county of Merrimack, in the State of New Hampshire, have invented a new and improved Method of Manufacturing French-Heads to Elliptic Springs; and I do hereby declare that the following is a full and exact description thereof, reference being had to the accompanying drawings, and to the letters of reference marked thereon.

The nature of my invention consists in constructing right and left dies for punching out ears of the required form to be fixed on the ends of the main leaf of an elliptic spring preparatory to welding, which greatly facilitates the making of French-heads to the same.

I do hereby declare that the following is a full, clear, and exact description thereof, which will enable others skilled in the art to make and use the same, reference being had to the accompanying drawings, forming part of this specification, in which—

Figure 1 is a perspective view of the top die or punch, showing a portion of the face cut away at $a$ for the purpose of forming the scarf $b$, fig. 5, which overlaps the steel, as shown at $b\ b$, fig. 6.

Figure 3 is the other side of fig. 1, showing a projection at $c$ for the purpose of forming the lip $d$, fig. 5.

Figure 4 is a plan or top view of the ear as formed by the matrix of the lower die fig. 2.

Figure 5 is a perspective view of an ear as formed by both dies, figs. 1 and 2.

Figure 6 is a perspective view of the end of an elliptic spring, with the ears fixed ready for welding.

Figure 7 is the under side of fig. 6, showing the manner in which the ears are securely held by the lips $d\ d$, for and during the process of welding.

Figure 8 is a finished French-head to an elliptic spring, made as above described.

The method heretofore used by carriage-spring makers in making French-heads to elliptic springs, is to weld a piece of iron of irregular shape on each side of the main leaf, and then cut it into the desired form with tools made for that purpose—a tedious process, requiring very skillful workmen.

My invention saves much time, and makes better work, all the heads being of uniform size. I do not limit myself to the particular form of dies as herein described.

What I claim as new, and wish to secure by Letters Patent, is—

1. The right and left dies, constructed substantially as and for the purpose herein described.

2. The application of the ears, fig. 5, to the ends of the main leaf of an elliptic spring, substantially as and for the purpose herein described and set forth.

JOSEPH PALMER.

Witnesses:
ANSON S. MARSHALL,
JOHN BURGUM.